T. L. McCONNAUGHEY.
VEHICLE WHEEL HUB.
APPLICATION FILED DEC. 26, 1907.

920,984.

Patented May 11, 1909.

WITNESSES:

INVENTOR
T. L. McConnaughey,
BY
ATTORNEY

UNITED STATES PATENT OFFICE.

THOMAS L. McCONNAUGHEY, OF HAGERSTOWN, INDIANA.

VEHICLE-WHEEL HUB.

No. 920,984.        Specification of Letters Patent.        Patented May 11, 1909.

Application filed December 26, 1907. Serial No. 408,126.

*To all whom it may concern:*

Be it known that I, THOMAS L. McCONNAUGHEY, a citizen of the United States of America, residing in Hagerstown, in the county of Wayne and State of Indiana, have invented a new and useful Vehicle-Wheel Hub, of which the following is a true and accurate specification and exposition, being such as will enable others to make and operate the same.

This present invention contemplates the provision of a relatively narrow (laterally) hub, with provisions whereby it may be adapted to operate in connection with an ordinary vehicle-axle.

The objects of this invention, primarily, are to provide a wheel whose hub will occupy a minimum amount of space at the sides of the vehicle; to provide a hub which may be permanently connected to the vehicle-axle, or made detachable therefrom; to provide a wheel which will be ball-bearing (or roller bearing) and will be practically frictionless, and dispense with the necessity of supplying oil thereto; and to provide a construction which will guard the interior parts from dust and dirt.

Broadly stated: my object is to provide a hub which will be strong and durable in construction, neat and attractive in appearance, by which the vehicle will occupy a minimum amount of space, and which can be manufactured and sold at a comparatively low price.

Other objects and particular advantages will be brought out in the course of the following specification.

One manner for carrying out the objects of my invention, and that which in practice has been found to be the most practical, is illustrated in the accompanying drawings, in which—

Figure 1:
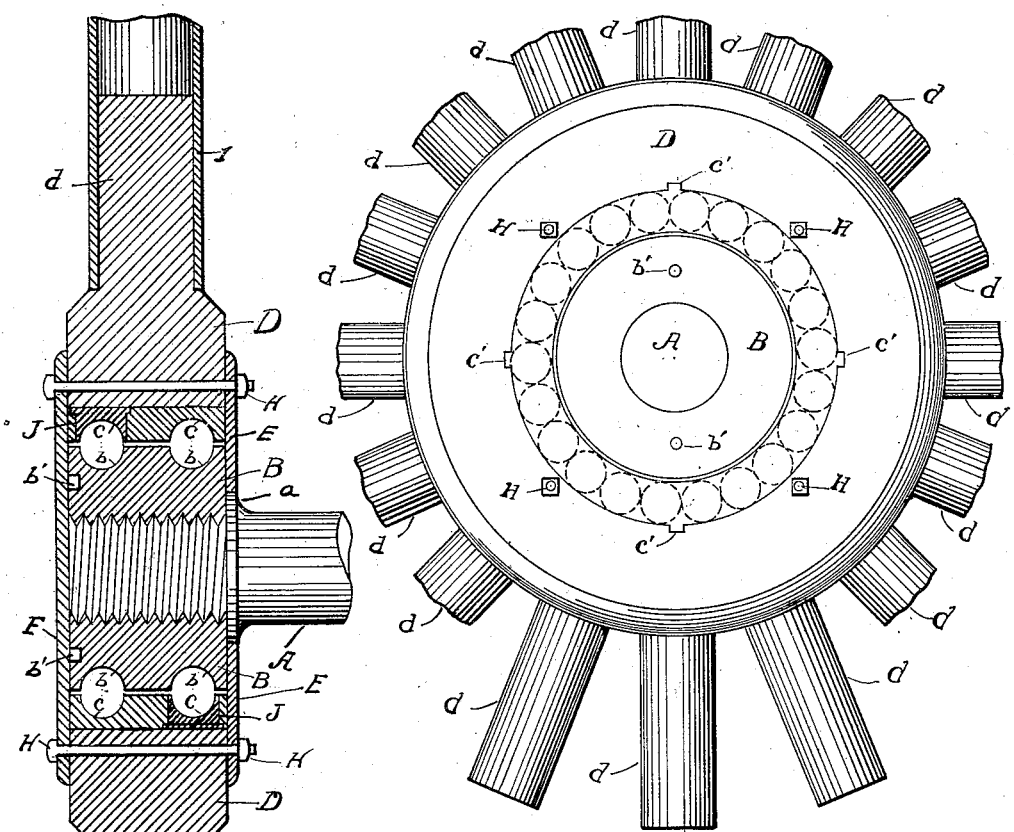
Figures 2, 4:
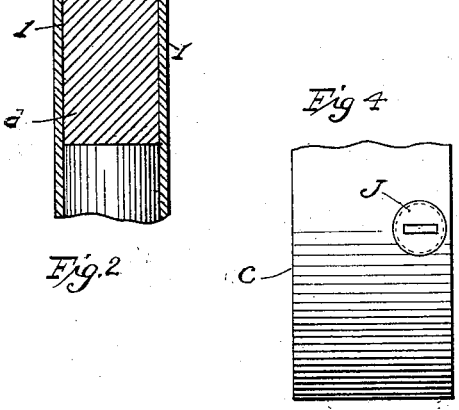
Figure 3:
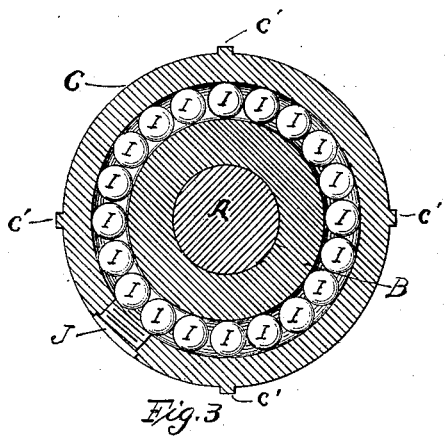

Figure 1 is a face view of my invention, the outer disk or cap being removed. Fig. 2 is a central cross section of the invention. Fig. 3 is a detail sectional view of the central portion of the hub, same being taken at right angles to that of Fig. 2. And, Fig. 4 is a detail plan view of a portion of the periphery of the revoluble rim, showing one of the plugs in position.

Similar characters of reference denote like parts throughout the several views of the one-sheet of drawings.

In order that the invention and its operation may be fully understood your orator will now take up a description thereof in concrete detail.

In the drawings the letter A denotes a vehicle axle or spindle, having therearound the usual flange *a*, with which the ordinary wheel-hub contacts, but in this instance the greater portion of the spindle, outside said flange, is cut off, and the remaining portion thereof is threaded as indicated in Fig. 2. Said threads, of course, should turn in a direction the same as that in which the wheel is to revolve.

The letter B indicates the core of my hub, being in fact a disk whose thickness is equal to the length of the spindle outside the flange *a*. A threaded aperture is formed through the center of said core to receive the threaded portion of the axle, or spindle, as shown in Fig. 2. Said core is to be run on tightly, or it may be otherwise secured, as, for instance, it may be formed integral with the axle. In order that the core may be turned properly to position there are formed in its face two small apertures $b'—b'$, by which a spanner wrench may be engaged therewith. Extending around in the periphery of said core are two (preferably,) half-round grooves $b—b$, shown in Figs. 2 and 3.

The letter C denotes the revoluble ring which is formed of the same thickness as is the core B, having a central aperture therethrough which is slightly greater than is the diameter of the core B around which it is disposed as shown. In the inner face of said ring are formed therearound two half-round grooves $c—c$, registering with and of the same size as said grooves $b—b$. When the ring C is in position with relation to the core B, as shown in Fig. 2, it is evident that said grooves, $b—c$ and $b—c$ form two substantially round channels, each to be filled with a plurality of balls I, which are of a size to almost fill said channels and separate the core B and the ring C from contact with each other. In order that said balls may be placed in their channels, or removed therefrom, I have formed threaded apertures thereinto which are disposed through the ring, extending from the periphery thereof centerward. One of said apertures enters each of said channels and each is adapted to be closed by a plug, as for instance the plugs J. The inner ends of said plugs form a part of the respective channels, said plugs being first inserted in the position they are to occupy before said grooves are formed in the ring C; then of course when they are removed and replaced they will always come back to the proper position as shown.

It is understood that the ring C is to be placed around the core B, the plugs being removed, and the balls I are inserted, after which the plugs are replaced and the balls will be retained in the channels therefor which will retain the ring and the core in proper relations to each other and allow the ring to rotate freely around the core.

Extending out from the periphery of the ring C are a plurality of lugs c', for the purpose hereinafter set forth.

The letter D denotes the hub rim having a plurality of stubs b radiating from the periphery thereof. Each of said stubs is adapted to enter the inner end of a tubular spoke 1, as shown in Fig. 2. The thickness of said rim D is equal to the thickness of the ring C, or the core B, and the central aperture through said rim is equal to the diameter of the ring C around which it is disposed as shown. In the inner periphery of the rim D are formed notches to receive said lugs c', by which when brought to position the ring C and the rim D will be locked together.

The letter E denotes the inner disk, which closely surrounds the flange a, and extends out over the inner sides of the core B, the ring C, and some distance over the rim D as shown.

The letter F designates the outer disk, whose central part covers the outer end of the spindle, or axle A, and extends over the outer sides of the core B, the ring C, and some distance over the rim D. The disks E and F are alike in every particular, except that the former is provided with a central aperture therethrough for the flange, or for the axle when the flange is not employed.

Formed in an axial direction through the rim D are a plurality of apertures, and corresponding apertures are formed through the disks E and F, through which are disposed the bolts H, which retain said disks in place.

From the above it will be noticed that the assembling and operation of the several parts are almost self explanatory. For instance, the ordinary wheel may be removed from an old spindle, and the spindle is then cut off to the proper length and threaded as indicated. The disk E is then placed loosely in position around the flange a, after which the core B is run on and tightly abutted against the flange a, bringing the end of the spindle even with the outer face of the core B. The next step will be to place the ring C in place around the core, the plugs J being removed, the two channels c—b are filled with the balls I, and the plugs are then replaced. I now place the rim D around the ring C where they will be locked together, after which the disk F is brought to position, and the disks E and F are turned until the bolt apertures therethrough are in alinement with each other and with the bolt apertures in the rim D. I now insert the bolts H and after they are tightened in the usual manner the hub will be assembled in operative condition. The spokes 1 may now be placed in position each over one of the stubs d and their outer ends may be connected to the wheel felly (not shown) which will complete the wheel.

Having now fully shown and described my invention, what I claim and desire to secure by Letters Patent of the United States, is—

A vehicle wheel hub comprising a central core internally screw threaded and provided with circumferential grooves and with recesses at its outer end, the diameter of the core being greater than its length, a screw threaded axle screwing into the core, a ring surrounding the core and provided on its inner face with circumferential grooves and on its outer face with radially extending lugs, balls in the grooves of the core and ring, a second ring surrounding the first one and provided on its inner face with recesses engaging the lugs thereof, and on its outer face with spoke receiving and holding means, the said rings and core being of exactly the same length, clamping disks at the ends of the core, flush with and engaging the same and the said rings, and bolts passing through the clamping disks and the second ring.

In testimony whereof I have hereunto subscribed my name to this specification in the presence of two subscribing witnesses.

THOMAS L. McCONNAUGHEY.

Witnesses:
ELIZEBETH McCONNAUGHEY,
RALPH McCONNAUGHEY.